United States Patent
Keers

(10) Patent No.: US 8,873,333 B2
(45) Date of Patent: Oct. 28, 2014

(54) GEOPHYSICAL SIGNAL PROCESSING

(75) Inventor: Henk Keers, Oslo (NO)

(73) Assignee: WesternGeco L.L.C., Houston, TX (US)

(*) Notice: Subject to any disclaimer, the term of this patent is extended or adjusted under 35 U.S.C. 154(b) by 1439 days.

(21) Appl. No.: 12/519,218

(22) PCT Filed: Oct. 15, 2007

(86) PCT No.: PCT/GB2007/003910
§ 371 (c)(1),
(2), (4) Date: Dec. 1, 2010

(87) PCT Pub. No.: WO2008/081156
PCT Pub. Date: Jul. 10, 2008

(65) Prior Publication Data
US 2011/0128817 A1    Jun. 2, 2011

(30) Foreign Application Priority Data
Dec. 28, 2006  (GB) .................................. 0625953.5

(51) Int. Cl.
*G01V 1/30* (2006.01)
*G01V 1/28* (2006.01)

(52) U.S. Cl.
CPC .............. *G01V 1/28* (2013.01); *G01V 2210/56* (2013.01); *G01V 2210/60* (2013.01); *G01V 1/30* (2013.01)
USPC .................................. 367/38; 367/21; 702/14

(58) Field of Classification Search
USPC ................................. 367/38; 702/14
See application file for complete search history.

(56) References Cited

U.S. PATENT DOCUMENTS

| 5,181,171 A * | 1/1993 | McCormack et al. .......... 702/14 |
| 7,203,600 B2 | 4/2007 | Keers et al. |
| 7,382,685 B2 | 6/2008 | Ferber et al. |
| 2005/0143923 A1 | 6/2005 | Keers et al. |
| 2005/0190650 A1 | 9/2005 | Ferber et al. |
| 2007/0078604 A1 * | 4/2007 | Kim et al. ....................... 702/16 |

FOREIGN PATENT DOCUMENTS

| GB | 2409304 A | 6/2005 |
| WO | 2005114258 A1 | 12/2005 |

OTHER PUBLICATIONS

Boissonnat et al: "A coordinate system associated with points scattered on a surface", Computer—Aided Design, vol. 36, 2004, pp. 161-174.

Farin: "Triangular Bernstein-Bezier patches", Computer Aided Geometric Design, 3, 1986, pp. 83-127.

(Continued)

*Primary Examiner* — Ian J Lobo

(57) ABSTRACT

A method of processing geophysical signals obtained by—monitoring the response of the earth to an source using a plurality of receivers is described including the evaluation of sums or integrals of functions of weighted signal values over a one or multidimensional domain such that the domain is split into a plurality of simplices and the signal values are interpolated across the simplices using a non-linear approximation of the function, the approximation including signals and gradients of the signals, and the evaluated sums or integrals are used to obtain a representation of characteristics of the earth.

18 Claims, 3 Drawing Sheets

(56) References Cited

OTHER PUBLICATIONS

McLeod et al: "Geometry and interpolation of curves and surfaces", Cambridge University Press, Cambridge, United Kingdom 1998, pp. 1-23 and 281-289.

Robertsson et al: "On the use of multicomponent streamer recordings for reconstruction of pressure wavefields in the crossline direction", Geophysics, vol. 73, No. 5, 2008, A45-A49.

Xue et al: "On the reconstruction of three-dimensional complex geological objects using Delaunay triangulation", Science Direct, Future Generation Computer Systems, vol. 20, 2004, pp. 1227-1234.

Yilmaz: "Seismic data analysis. Processing, inversion, and interpretation of seismic data", Society of Exploration Geophysicists, vol. II, 2001, Tulsa, OK, p. 1019.

Ozbek et al:. "Multidimensional filtering of irregularly sampled seismic data", EAGE 67th Conference and Exhibition, Madrid, Spain, Jun. 13-16, 2005. paper A037.

Combined Search and Examination Report of British Application No. GB 0625953.5 dated Apr. 27, 2007.

International Search Report of PCT Application No. PCT/GB2007/003910 dated Feb. 6, 2008.

\* cited by examiner

GEOPHYSICAL SIGNAL PROCESSING

The present invention relates to a method of processing seismic signals or other geophysical data such as electromagnetic signals. It is applicable to seismic signal processing and migration techniques such as, for example, Kirchhoff migration, beam migration, wave equation migration, multiple attenuation and AVO (amplitude versus offset) analysis.

BACKGROUND OF THE INVENTION

One particular problem in processing seismic data is that the seismic data, and hence the value of the function A, are generally known only at $n_p$ n-dimensional points in the integration domain D. These points at which the seismic data are known will hereinafter be referred to as "data points". Integrals of functions A over a multi-dimensional integration space or surface D have traditionally been computed using a 'binning' algorithm as described in, for example, "Seismic data processing" by O. Yilmaz in Volume II, Society of Exploration Geophysicists, Tulsa, Okla. p. 1019 (2001).

A binning algorithm can be implemented in various ways. For example, one can evaluate such integrals by using a summation in which all the data points are given equal weights:

$$\int_D A dV = \text{Vol}(D) \Sigma_{i=1}^{n_p} A_i. \quad [1]$$

Vol(D) can be estimated roughly, but is often left out altogether in which case equation [1] reduces to:

$$\int_D A dV = \Sigma_{i=1}^{n_p} A_i \quad [2]$$

Alternatively one can divide the integration domain D up in a large number of 'bins' (typically squares or rectangles in the case of a two-dimensional domain), after which the average value of the function A in each bin is computed (see e.g. Yilmaz, 2001). The integral is then evaluated as the sum of all these average values:

$$\int_D A dV = \Sigma_i \tilde{A}_i \text{Vol}(b_i). \quad [3]$$

In equation [3] $\tilde{A}_i$ denotes the average of all measured values of A in the $i^{th}$ bin, Vol($b_i$) is the volume of the $i^{th}$ bin and the summation is over all the bins.

These prior art binning techniques can work reasonably well if the data points are distributed on a regular grid. However, the results are dependent on the binning grid size so that, even if the data points are distributed on a regular grid, errors can result if an unsatisfactory binning grid is applied. Furthermore, the data points acquired in a seismic survey are often not distributed over a regular grid—firstly, it is hard in practice to position the seismic sources and receivers exactly on a regular grid and, secondly, the actual optimal survey grid may be irregular rather than regular. If the data points are irregularly distributed over the integration domain then the prior art binning techniques are subject to further errors and become unreliable.

Further method to determining an integrals of the above described nature are disclosed for example in the United Kingdom published patent application GB-2409304-A. In the known method, the integration domain is partitioned into a plurality of multi-dimensional simplices. The function is integrated over each simplex, and the results are summed. In contrast to the binning method that uses the average signal value in a bin, this alternative method uses a trapezoidal or linear approximation of the signal value over the surface or volume of the simplex.

In the seismic industry more and more data set become available which include gradient data. The gradient data can be either directly measured or determined by differencing neighboring signal values. For example, the next generation marine seismic streamers is expected to record not only the pressure but also the three components of the velocity (gradient of the pressure). This new streamer also records the receiver locations accurately.

Such gradient information has been used in various applications such as filtering, as witnessed for example by the published United States patent application US-2005/0190650-A1, and interpolation, as disclosed for example in the published international patent application WO-2005/114258-A1.

The present invention seeks to provide a further improvement of the methods of GB-2409304 A in the processing of seismic or other signals where the processing step requires integration of signal-related functions over generalized volumes.

SUMMARY OF THE INVENTION

The invention describes a method of processing geophysical signals obtained by monitoring the response of the earth to an source using a plurality of receivers including the evaluation of sums or integrals of weighted signal values over a one or multidimensional domain such that the domain is split into a plurality of simplices and the signal values are interpolated across the simplices using a non-linear interpolation, particularly with gradients, and the evaluated sums or integrals are used to obtain a representation of characteristics of the earth.

A new method can be applied to many seismic processing algorithms, including beam forming, multiple attenuation and imaging.

The method uses preferably recorded seismic data and the locations of the seismic sources and receivers. If the gradient of the seismic data with respect to the source and receiver positions are measured as well, then these can be incorporated in the processing algorithm.

The gradients are for example measured in a streamer that measures the pressure and its gradient. They can also be measured in other seismic or wellbore acquisition systems such as seabed and land acquisition systems.

In cases where the gradient data are not measured directly, they can be determined using differencing, provided the data are close enough together for the differencing to be accurate.

The preferred processing algorithms have the form of equation $$\int_{D_n} \prod_{i=1}^{p} \prod_{j=1}^{q} w_i(x) d_j(x) dx. \quad [4]$$

One preferred implementation of the algorithm includes the steps of first splitting the integration domain is into simplices such as triangles, Voronoi or Delaunay cells. In the next step the integration is carried out over each triangle separately, the contribution from each triangle is then summed. The integration over a simplex can be done by approximating the integrand by a higher order function, preferably often a polynomial function, and computing the integral over the simplex directly using the approximation.

If one uses the gradient of the data in addition to the data itself, for the computation of the integrand over the triangle in either of these methods, then the integration will be more precise. The higher order integration method when compared with two other known integration methods delivers an improved accuracy in the resulting values of the integrals.

These and further aspects of the invention are described in detail in the following examples and accompanying drawings.

BRIEF DESCRIPTION OF THE DRAWINGS

The invention will now be described, by way of example only, with reference to the accompanying drawings, of which.

DETAILED DESCRIPTION

Figure 1:
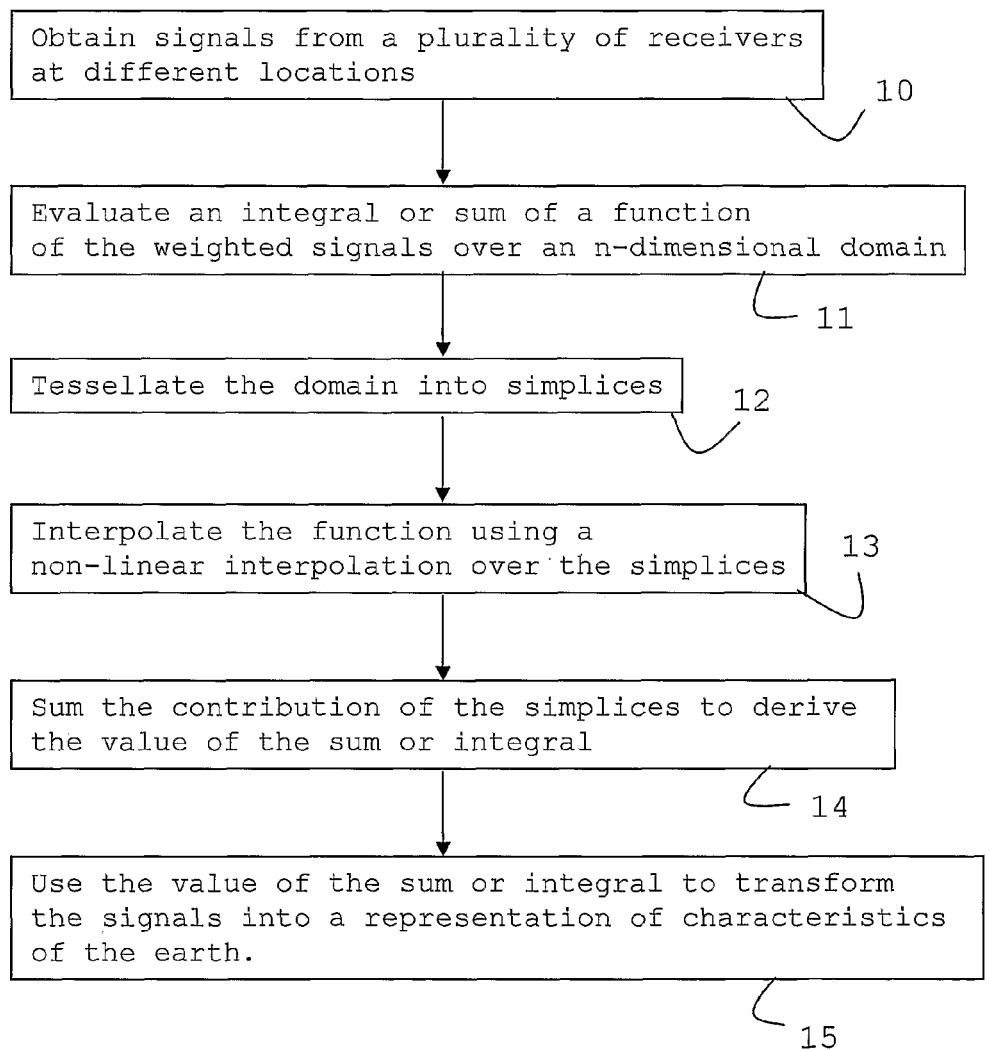
FIG. 1 is a flow chart of steps in accordance with an example of the invention.

As shown in the flow chart of FIG. 1, which represents steps of an example of the novel methods in accordance with the present invention, the present invention includes the evaluation (Step 11) of integrals over functions of weighted geophysical signals obtained initially by arrays of receivers (Step 10).

The integrals and functions can be characterised by the general form:

$$\int_{D_n} \prod_{i=1}^{p} \prod_{j=1}^{q} w_i(x) d_j(x) dx \quad [4]$$

where $D_n$ is a n-dimensional integration domain, $d_j$ are the signals, or data derived from the signal, known only at a number of discrete points. The gradient of $d_j$ at these points or different points will be known in some cases as well either through direct measurement or calculation. The weight or taper functions $w_i$ can be known everywhere or again at a number of discrete points.

The application of this form of integration can be over, for example, source and receiver positions, midpoints only, midpoint and offsets or scattering angles etc. The integration domain typically is a two-dimensional domain, but it could be of higher dimension.

The integrand $d_j$ can be the seismic data, or part of the seismic data, and may also contain some theoretical terms. Integrals of this type occur in seismic data processing in, for example, migration algorithms (pre stack and post stack migration; time and depth migration; Kirchhoff, beam and wave equation migration), attenuation of multiple reflections in marine data, AVO analysis etc.

Depending on the type of signals and the application, the numbers n, p and q are small and their specific values depend on the seismic processing algorithm. Typically n is between 1 and 7, p and q are between 0 and 3 and p+q≥2. The weights and the data are usually smooth functions. However, the data are more oscillatory than the weights, and therefore knowledge of the gradient of the data is important.

In general the above integrals' [4] lead either directly or in combination with other known processing steps, which are not detailed herein, to an improved representation of the earth's interior (Step 15).

The integrals [4] can be evaluated in three steps 12-14.

In the first step 12 of these three steps, the integration domain is tessellated using the points at which the data are known.

Then (Step 13) the integral is reduced to a sum of integrals over simplices:

$$\int_{D_n} \prod_{i=1}^{p} \prod_{j=1}^{q} w_i(x) d_j(x) dx = \sum_{k=1}^{n_s} \int_{S_k} \prod_i \prod_j w_i(x) d_j(x) dx, \quad [5]$$

where $n_s$ is the number of simplex and $S_k$ denotes the k-th simplex.

The third 14 of the three step consists of summing the contributions of each simplex.

As the first and third steps 12, 14 are well established in the relevant literature, the following detailed description is focused mostly on the second step 13.

In most applications, it can be assumed that the functions $w_i$ and its gradient are known throughout the simplex or at the vertices. The functions $d_j$ and its gradients are in this example assumed to be only known at the vertices.

Various existing approximation techniques can be used to determine $d_j$ within the vertex. If the w and d functions are approximated by a polynomial then the integration can be performed directly. Various algorithms can be derived to determine these integrals over simplices to be described in more detail below.

In case that the functions w and d are given by functions other than polynoms, e.g., rational functions, then a simplex can be divided into smaller sub-simplices. Higher-order approximations of the functions of the integrand can be used to determine the function values at the vertices of the sub-simplices and the integration itself can be performed over each sub-simplex using for example the known linear interpolation. This variant can be seen as a method which takes advantage of the higher accuracy of the higher-order non-linear approximations including gradient information and the known linear approximations conventionally used for integration of this type.

In the following, a first example is described for the relatively simple case of one-dimensional simplices (i.e. line segments.

In this 1D case n signal functions $f_i$ and its derivative $f_i'$ are given at a number of data points $x_i$ on the real axis. For simplicity the functions are assumed to be recorded at all data points. The 1D integral is $$\int_{x_0}^{x_1} \prod_{i=1}^{n} f_i dx \quad [6]$$

where $x_0 < x_1$. Of the several known non-linear approximation schemes, Hermitian interpolation is used to approximate the integrand. Hermitian interpolation is expected to provide accurate results for small n.

In general, given a function f and its derivative f' at points x and y, denoted by $f_0$, $f_1$, $f_0'$, $f_1'$ respectively, a known approximation can be:

$$f = \sum_{i=1}^{3} f_i s^3 \quad [7]$$

with $s=(x-x_0)/(x_1-x_0)$ and $f_1 = f(x_0)$ $f_2 = (x_1-x_0)f'(x_0)$ $f_3 = 3(f(x_1)-f(x_0))-(x_1-x_0)(2f'(x_0)+f'(x_1))$ $f_4 = 2(f(x_1)-f(x_0))+(x_1-x_0)(f'(x_0)+f'(x_1))$ For the lower values of n the integration from $x_0$ to $x_1$ is given in the following.

If $n = 1$ then, $$\int_{x_0}^{x_1} f(x)dx = \quad [8]$$
$$\frac{1}{12}(x_1-x_0)^2(f'(x_0)-f'(x_1)) + \frac{1}{2}(x_1-x_0)(f(x_0)+f(x_1))$$

If $n = 2$ then $$\int_{x_0}^{x_1} f_1(x)f_2(x)dx = (x_1-x_0)\sum_{i=1}^{4}\sum_{j=1}^{4} \frac{1}{9-(i+j)} f_{1i} f_{2j} \quad [9]$$

and if $n = 3$ then $$\int_{x_0}^{x_1} \prod_{i=1}^{n} f_i(x)dx = (x_1-x_0)\sum_{i_1,i_2,i_3=1}^{5} \frac{1}{16-(i_1+i_2+i_3)} f_{1i_1} f_{2i_2} f_{3i_3} \quad [10]$$

For a two-dimensional (2D) application, the integration domain can be triangulated following known method described for example in the two cited references US-2005/0190650-A1 and WO-2005/114258-A1.

Following the triangulation, the integration can be reduced to a summation of integrals over one triangle. To solve the Integration over one triangle can hence be regarded as an important step of this example.

This integration consists of two steps: interpolating the function over the triangle and integrating the interpolated function over the triangle.

For the interpolation a number of options are described in the mathematical literature. The applicability of any given interpolation depends for example on how smooth the function is. If integrating over a triangle does not require the function to be smooth; a continuous or a continuously differentiable function may suffice.

The interpolation can for example be done using triangular Bernstein-Bezier patches as described for example by G. Farin in: "Triangular Bernstein-Bezier Patches, Computer Aided Geometric Design, 3, p. 83-127 (1986), in barycentric coordinates (u,v,w).

A continuous function defined this way is given by $f(u,v,w) = b_{3,0,0}u^3 + 3b_{1,2,0}u^2v + 3b_{2,0,1}u^2w + 3b_{1,2,0}uv^2 +$
$3b_{1,0,2}uw^2 + b_{0,3,0}v^3 + 3b_{0,2,1}v^2w + 3b_{0,1,2}w^3 +$
$6b_{1,1,1}uvw$ [11]

where $b_{i,j,k}$ are linear functions of the values of f and/or its gradient at the vertices.

Given this interpolation of functions $f_i$ the integration over the triangle T becomes $$\int_T \prod_{i=1}^{n} f_i(x,y)dxdy = 2 \text{ Area } (T) \int_0^1 \int_0^{1-v} \prod_{i=1}^{n} g_i(u,v)dudv \quad [12]$$

where $f_i(x(u,v), y(u,v))=g_i(u,v)$. The integral on the right of equation [12] can be computed explicitly. The integrand is a polynomial with terms $u^p v^q$ resulting in:

$$\int_0^1 \int_0^{1-v} u^p v^q du dv = \frac{p!q!}{(p+q+1)!} \quad [13]$$

As an alternative method, the triangle T can be split in a number of sub-triangles. The values of the integrand at the vertices of all the sub-triangles can be calculated using the approximation of eq. [11]. With these values known, the integral can be determined by integrating over each sub-triangle using a linear approximation.

The above described methods can be applied to a number of seismic processing steps using specific values of n, p and q and for specific functions w and d. Examples for three of the main seismic processing applications filtering/beam forming, multiple attenuation and imaging are described in the following.

In an example of filtering noisy seismic signals, the functions d can be single-sensor data recorded at irregular receiver locations and a filter w designed to protect the signal while rejecting at least part of the noise. For more details of the background of this filtering, reference is made to the above-cited published application US-2005/0190650-A1.

For the purpose of the present invention, it is worth considering the following integrals as examples:

$g(r)=\int w(x,r)d(x,r)dx$ [14]

In this example and using the notation introduced above, p=1, q=1 and n=2. The 2D integration parameter x in this case is given by receiver locations. Equation [14] can be computed using the trapezoidal rule as described in US-2005/0190650-A1. However, following the novel methods of this invention the interpolation can be improved using the respective gradients of w and d and interpolating w and d within each triangle, as discussed in the previous section.

Regarding multiple attenuation, it is known to group the multiple removal methods into two groups: surface multiples and internal multiples. Examples of the former are the 2D SRME algorithms, 3D SRME algorithms and Radon multiples, all of which are well know in the field. As an example the 2D and 3D SRME algorithms is considered here. These methods lead to integrals of the form:

$$\int_D d(r, x, t) * d(x, s, t)dx \quad [15]$$

Here r indicates the receiver position, s indicates the source position and * indicates convolution. In these examples q=0, p=2 and n=1 for 2D SRME or n=2 for 3D SRME.

An added complication in this case is that the different parts of the integrands are known at different points. For example the integrand d(r,x,t) may be known only at the points $x_i$ (i=1, ..., n) whereas d(x,s,t) may be known only at the points x_i (i=n+1, ..., p). A further complication for 3D SRME is usually the lack of signals recording in the cross line direction, i.e. perpendicular to the line of recording receivers.

The knowledge and use of gradient information of d reduces the problems caused by these complications, using the improved interpolation/extrapolation and integration techniques discussed above. In the case of Radon integrals q=1 and p=1 and n=1 or n=2; in the case of internal multiples q and p may take any (small) value and n can, in theory, be large. The exact integrals depend on the order of the internal multiple and the various approximations made using for example the method of stationary phase.

Imaging or migration is a process where the recorded signals the signal energy is migrated back to the location of the reflector. Many different types of imaging methods exist. The three main ones are known as wave equation imaging, beam imaging and Kirchhoff imaging. Imaging methods at their core are based on the evaluation of integrals of the form:

$$\int_D \Pi_{i=1}^q w_i(x) d(x) dx \quad [16]$$

with typically q=1 and p=1; q may be higher in theory, but this is in practice rarely used as the functions w is much less oscillatory than d. The value n is typical 2 in practice, but extensions to n=3 and n=4 can be envisioned to become more important in the near future. In the case of 3D beam migration n can go up to seven (7=3+2+2: 3 because of the dimensionality of the problem and 2 times 2 because of the angles on the scattering sphere.

In the case of Kirchhoff migration n=2, and x represents the midpoints between source and receivers. If n=3 or n=4 then the additional dimensions come from the offsets. Alternatively, the integration may be over the scattering angles. In this case the integration is over the product of two spheres: $S^2 \times S^2$, and therefore four-dimensional.

As in the previous examples, if the gradients of w and d are known, then the known integration methods can be improved considerably. This is especially important in the context of antialiasing.

It is instructive to compare the performance of the two known integration methods, i.e., binning and integration using linear interpolation, with the method proposed herein.

In the first comparative example the known and the new integration methods are applied to a simple case: the computation of the reflectivity of a single flat reflector in two dimensions (2D), with zero-offset acquisition geometry. The integration has the form $$\delta c(x) = \int w(m,x) d(m,x,t=T(m,x)) dm, \quad [17]$$

where x is the image point, m the midpoint location, δc is the velocity perturbation, w the theoretical weight function and d the data, which is evaluated at time t=T.

Figure 2:
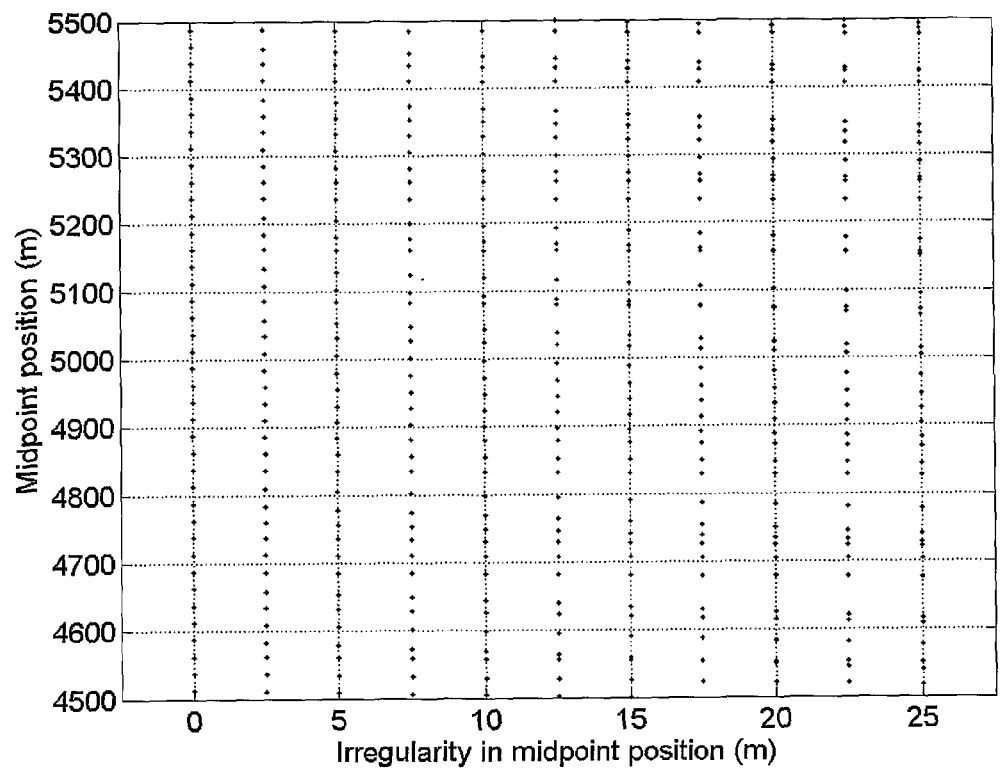
FIG. 2 illustrates original and perturbed positions of receivers for use in a comparative example.

The source wavelet applied is a Ricker wavelet with dominant frequency of 70 Hz. The reflectivity δc is computed for various acquisition geometries which are shown in FIG. 2. The figure shows the midpoint positions on the vertical axis as a function of irregularity in the midpoint position on horizontal axis. As a starting point, a regular acquisition geometry with midpoints 25 m apart is taken represented by the regular line of dots at 0 irregularity.

This geometry was then perturbed ten times with random (Gaussian) errors. These errors are multiples of 2.5 m. All resulting ten geometries are plotted in FIG. 2.

Then the reflectivity at the depth of the reflector for the regular geometry is computed using the higher order integration method of the present invention and the two known methods. The reflectivity is normalized to one and the reflectivity is flat. For the regular geometry the results of the two known methods are practically identical with the higher order integration method.

However, if a perturbed version of the regular midpoints is taken as the basis for the evaluation of the integral [16], then the reflectivity changes. To demonstrate differences, the reflectivity is computed using the three different methods for an error in the midpoint positions of 20 m.

The reflectivity computed using the binning method varies significantly. The bin size used was 25 m. The other two methods give better results, as the reflectivity varies less. The reflectivity computed using the higher order reflection method shows less variation than that computed using the linear integration. Thus the higher order interpolation method gives the best results.

Figure 3:
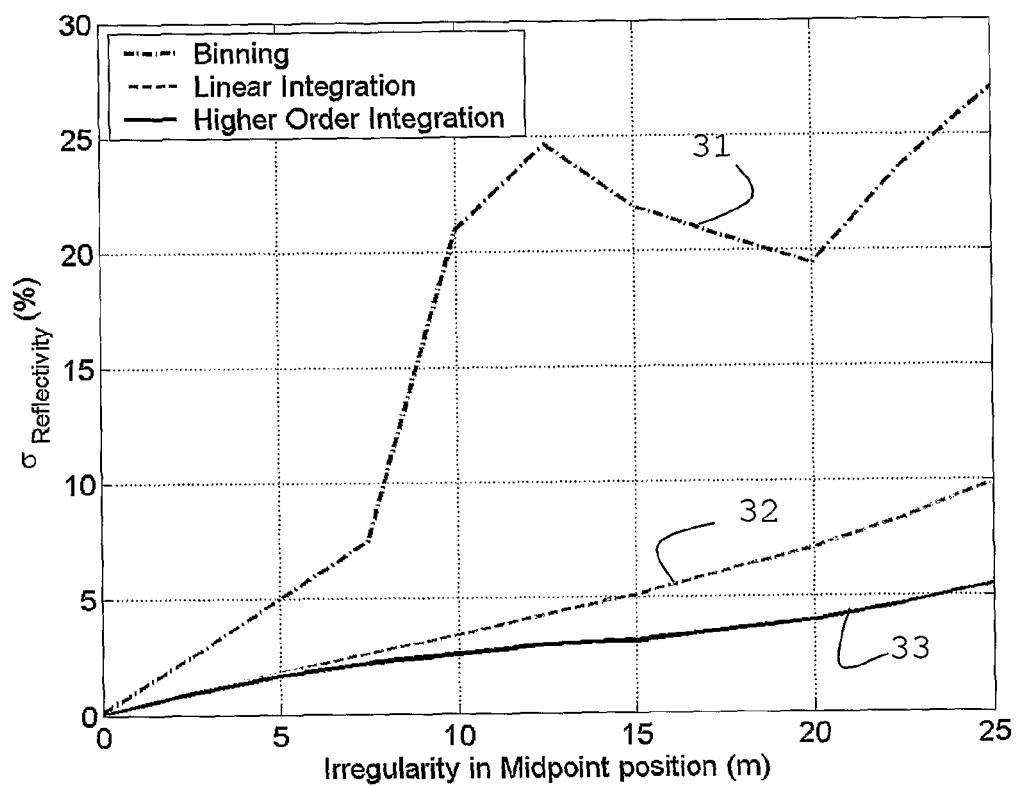
FIG. 3 shows the variance in the reflectivity as a function of irregularity in the midpoint position for three integration methods of the comparative example.

A measure for the accuracy of the three respective integration methods is provided by the variance of the reflectivity. FIG. 3 shows the variance of the reflectivity for the three integration methods as a function of the random error in the midpoint position as taken from FIG. 2.

For all three methods the variance is zero for zero irregularity. The variance increases with increasing error. Most noticeably the variance in the binning method 31 increases quite strongly and somewhat irregularly. This is partially due because some of the bins are empty. The variances in the other two methods increase slower and more linearly. For small perturbation in the regular midpoint positions differences in these integration methods becomes minimal. However for larger irregularities the higher order integration methods 33 of this invention is clearly better than the known linear interpolation method 32. In this case a cubic integration, that uses the derivative information, gives a better approximation to the integrand, and thus to the integral, than the linear integration.

The invention claimed is:

1. A method of obtaining a representation of characteristics of the earth comprising;
receiving and recording geophysical seismic signals which are measurements of pressure at a plurality of receivers,
monitoring the response of the earth to a seismic source at a plurality of receivers,
processing the signals wherein the method further includes;
determining gradients of the signal measured pressure values,
evaluating sums or integrals of functions of weighted signal values over a one or multidimensional domain, wherein the domain is split into a plurality of simplices and the signal values are interpolated across the simplices using the gradients of the signal measured pressure values to give non-linear approximations of the functions within simplices, and
using the evaluated sums or integrals to obtain a representation of characteristics of the earth.

2. The method of claim 1 wherein the gradients are measured by the plurality of receivers.

3. The method of claim 1 wherein the gradients are calculated from signals obtained using the plurality of receivers and knowledge of the respective positions of said receivers.

4. The method of claim 1 wherein the receivers are towed behind a seismic acquisition vessel.

5. The method of claim 1 wherein the receivers are placed on the surface of the earth.

6. The method of claim 1 wherein the functions are approximated by polynomial functions.

7. The method of claim 1 wherein the sums or integrals are of the form $$\int_{D_n} \prod_{i=1}^{p} \prod_{j=1}^{q} w_i(x) d_j(x) dx$$

where $D_n$ is a n-dimensional integration domain, $d_j$ are the signals, or data derived from the signal, known only at a number of discrete points x, and $w_i$ are a weight or taper functions.

8. The method of claim 1 further including the step of evaluating the sums or integrals to remove noise from the signals.

9. The method of claim 1, further including the step of evaluating the sums or integrals to generate group-formed signals representing a combined output of a subset of the plurality of receivers.

10. The method of claim 1, further including the step of evaluating the sums or integrals to attenuate or remove from the obtained signals multiple signals caused by multiple reflections of the obtained signals on the path from the source to the receivers.

11. The method of claim 10, wherein the sums or integrals include a convolution of the obtained signals.

12. The method of claim 10, wherein the sums or integrals include a Radon type integral.

13. The method of claim 1, wherein the weight applied to the weighted signal value is 1.

14. The method of claim 1, further including the step of evaluating the sums or integrals to generate a map representing reflectivity of a section of the earth.

15. The method of claim 14, further including the step of evaluating the sums or integrals to migrate signal energy from the receiver location to a reflection point or layer inside the earth.

16. The method of claim 14, further applying a method selected from group consisting of wave equation imaging, beam imaging and Kirchhoff imaging.

17. The method of claim 1, wherein the approximations are used to evaluate the sum or integral over the simplices directly.

18. The method of claim 1, wherein the approximations are used to determine functions values within the simplices and using said functions values to split the simplices into sub-simplices and using a linear approximation of the functions to evaluate the sum or integral over said sub-simplices.

* * * * *